US011687048B2

(12) United States Patent
Norton et al.

(10) Patent No.: US 11,687,048 B2
(45) Date of Patent: Jun. 27, 2023

(54) METHOD AND APPARATUS FOR EVALUATION OF TEMPERATURE SENSORS

(71) Applicant: Johnson Controls Tyco IP Holdings LLP, Milwaukee, WI (US)

(72) Inventors: Alexandra K. Norton, Duxbury, MA (US); Tyler H. Brown, New Haven, CT (US); Miguel Galvez, Plaistow, NH (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 804 days.

(21) Appl. No.: 15/707,167

(22) Filed: Sep. 18, 2017

(65) Prior Publication Data
US 2019/0086881 A1  Mar. 21, 2019

(51) Int. Cl.
*G08B 17/00* (2006.01)
*G01K 15/00* (2006.01)
(Continued)

(52) U.S. Cl.
CPC ........... *G05B 15/02* (2013.01); *G01K 15/007* (2013.01); *G06Q 10/00* (2013.01); *G06Q 10/20* (2013.01);
(Continued)

(58) Field of Classification Search
CPC ...... G05B 15/02; G08B 29/046; G08B 29/04; G08B 17/00; G01K 15/007; G01K 3/10; G06Q 10/20; G06Q 10/00
See application file for complete search history.

(56) References Cited

U.S. PATENT DOCUMENTS 6,150,936 A   11/2000 Addy
7,633,392 B2  12/2009 Neuwirth
(Continued)

FOREIGN PATENT DOCUMENTS

CN    104135074 A  * 11/2014
CN    104501963 A  *  4/2015
(Continued)

OTHER PUBLICATIONS

Anindya Dey, "Namatad: Inferring Occupancy from Building Sensors using Machine Learning", 2016 IEEE 3rd World Forum on Internet of Things (WF-OIT), pp. 478-483, Dec. 1, 2016, see Abstract. (Year: 2016).*

(Continued)

*Primary Examiner* — Tan D Nguyen
(74) *Attorney, Agent, or Firm* — ArentFox Schiff LLP

(57) ABSTRACT

A service management system facilitates service on building management systems. A connected services system of a connected services system stores temperature information from temperature detectors of building management systems (including heat detectors of fire alarm systems and thermostats of building automation systems), which send sensor values to control panels, which, in turn, send the temperature information to the connected services system. A temperature detector evaluation module of the connected services system retrieves the temperature information from the connected services database, generates aggregate temperature information based on the temperature information and then determines which of the temperature detectors require service based on the aggregate temperature information, for example, by detecting outlier temperature information. Scheduled service tasks for the temperature detectors requiring service are then pushed to a service workflow module, which sends the scheduled service tasks to a mobile com- (Continued)

puting device operated by a technician performing the service.

28 Claims, 7 Drawing Sheets

(51) Int. Cl.
| | |
|---|---|
| *G08B 29/04* | (2006.01) |
| *G06Q 10/00* | (2023.01) |
| *G01K 3/10* | (2006.01) |
| *G05B 15/02* | (2006.01) |
| *G06Q 10/20* | (2023.01) |

(52) U.S. Cl.
CPC ............. *G08B 17/00* (2013.01); *G08B 29/04* (2013.01); *G08B 29/046* (2013.01); *G01K 3/10* (2013.01)

(56) References Cited

U.S. PATENT DOCUMENTS

| | | | |
|---|---|---|---|
| 8,797,157 B2 | 8/2014 | Haynes | |
| 9,900,115 B2 | 2/2018 | Rauworth et al. | |
| 10,359,771 B2 | 7/2019 | Trainor et al. | |
| 2004/0107126 A1 | 6/2004 | Kataoka et al. | |
| 2004/0204977 A1* | 10/2004 | Obert | G06Q 10/06 705/7.15 |
| 2004/0217857 A1 | 11/2004 | Lennartz et al. | |
| 2007/0055760 A1 | 3/2007 | McCoy et al. | |
| 2007/0232288 A1 | 10/2007 | McFarland et al. | |
| 2008/0084291 A1 | 4/2008 | Campion et al. | |
| 2008/0218330 A1 | 9/2008 | Biles et al. | |
| 2009/0256699 A1 | 10/2009 | Huseth et al. | |
| 2010/0286937 A1* | 11/2010 | Hedley | G06Q 50/06 702/60 |
| 2012/0022700 A1* | 1/2012 | Drees | G06Q 30/0283 700/276 |
| 2012/0259583 A1* | 10/2012 | Noboa | H02J 13/0062 702/179 |
| 2013/0169681 A1 | 7/2013 | Rasane et al. | |
| 2013/0308674 A1 | 11/2013 | Kramer et al. | |
| 2014/0119674 A1 | 5/2014 | Das et al. | |
| 2014/0169398 A1* | 6/2014 | Arndt | G01K 15/007 374/1 |
| 2014/0218164 A1 | 8/2014 | Mahapatra et al. | |
| 2014/0292348 A1 | 10/2014 | Kanne et al. | |
| 2014/0336984 A1* | 11/2014 | Starr | G05B 23/0235 702/183 |
| 2015/0051749 A1 | 2/2015 | Hancock et al. | |
| 2015/0057810 A1* | 2/2015 | Smith | G05B 13/024 700/276 |
| 2015/0142491 A1 | 5/2015 | Webb | |
| 2015/0260541 A1 | 9/2015 | Smith | |
| 2015/0261229 A1 | 9/2015 | Roy | |
| 2015/0262114 A1 | 9/2015 | Ming | |
| 2015/0308704 A1 | 10/2015 | Jung et al. | |
| 2015/0312696 A1 | 10/2015 | Ribbich et al. | |
| 2015/0316907 A1 | 11/2015 | Elbsat et al. | |
| 2015/0327010 A1 | 11/2015 | Gottschalk et al. | |
| 2016/0117785 A1* | 4/2016 | Lerick | G06Q 10/1095 705/305 |
| 2016/0155098 A1* | 6/2016 | McElhinney | G01M 99/008 705/305 |
| 2016/0187127 A1 | 6/2016 | Purohit et al. | |
| 2016/0313023 A1* | 10/2016 | Przybylski | F24F 11/30 |
| 2016/0327293 A1 | 11/2016 | Grabowski et al. | |
| 2017/0011312 A1 | 1/2017 | Subramanian et al. | |
| 2017/0074536 A1 | 3/2017 | Bentz et al. | |
| 2017/0090441 A1 | 3/2017 | Schmitt et al. | |
| 2017/0188188 A1 | 6/2017 | Kang | |
| 2017/0213303 A1 | 7/2017 | Papadopoulos et al. | |
| 2017/0351278 A1* | 12/2017 | Raghavan | A47J 37/00 |
| 2018/0161694 A1* | 6/2018 | Lee | B01D 3/346 |
| 2018/0254965 A1 | 9/2018 | Son et al. | |
| 2018/0279067 A1 | 9/2018 | Ivanov et al. | |
| 2019/0325368 A1 | 10/2019 | Turney et al. | |

FOREIGN PATENT DOCUMENTS

| | | | |
|---|---|---|---|
| CN | 103413139 B | * | 5/2015 |
| KR | 1529563 B1 | * | 4/2014 |
| KR | 1908865 B1 | * | 12/2018 |
| WO | WO 2012130670 | | 10/2012 |

OTHER PUBLICATIONS

NPLIQPlus—IP.com Search. (Year: 2020).*
Ammar, Ahmad "Mining Building Performance Data For Energy-Efficient Operation", Nov. 2010, Advanced Engineering Informatics, 25, (2011), pp. 341-354. (Year: 2010).*
Shiblee Sadik, "Research Issues In Outlier Detection For Data Streams", 2014, ACM SIGKDD Explorations, vol. 15, Issue 1, pp. 33-40. (Year: 2014).*
Jonathan Kuo, "Micromachined Thermal Flow Sensors—A Review", 2012, Micromachines, 3, pp. 550-573. (Year: 2012).*
Honglei Guo, "Fiber Optic Sensors for Structural Health Monitoring of Air Platforms", 2011, Sensors, 11, pp. 3687-3705. (Year: 2011).*
European Search Report, dated Feb. 20, 2019, from European Application No. 18194953.8, filed on Sep. 17, 2018. 8 pages.
European Search Report dated Feb. 28, 2019 for European Patent Application No. 18194954.6 filed Sep. 17, 2018. 10 pages.
Partial European Search Report, dated Feb. 15, 2019, from European Application No. 18195315.9, filed on Sep. 18, 2018. 12 pages.
European Search Report, dated May 22, 2019, from European Application No. 18195315.9, filed on Sep. 18, 2018. 10 pages.
European Search Report dated Mar. 1, 2019, from European Patent Application No. 18194955 filed Sep. 17, 2018. 9 pages.
European Search Report dated Mar. 6, 2019, from European Patent Application No. 18194956.1, filed on Sep. 17, 2018. 9 pages.
European Search Report, dated Mar. 4, 2019, from European Patent Application No. 18194957.9, filed on Sep. 17, 2018. 10 pages.

* cited by examiner

METHOD AND APPARATUS FOR EVALUATION OF TEMPERATURE SENSORS

RELATED APPLICATIONS

This application is related to:

U.S. application Ser. No. 15/707,135, filed on Sep. 18, 2017, entitled "Method and Apparatus for Cloud Based Predictive Service Scheduling and Evaluation," now U.S. Patent Publication No.: 2019/0086877 A1;

U.S. application Ser. No. 15/707,142, filed on Sep. 18, 2017, entitled "Method and System for Service Verification Using Access Control System," now U.S. Patent Publication No.: 2019/0089703 A1;

U.S. application Ser. No. 15/707,148, filed on Sep. 18, 2017, entitled "Method and System for Service Verification Using WiFi Signal Strength Mapping," now U.S. Patent Publication No.: 2019/0090215 A1;

U.S. application Ser. No. 15/707,154, filed on Sep. 18, 2017, entitled "Method and Apparatus for Mapping Devices by Using Posted Maps," now U.S. Patent Publication No.: 2019/0087078 A1;

and

U.S. application Ser. No. 15/707,161, filed on Sep. 18, 2017, entitled "Method and Apparatus for Verifying Service of Installed Devices Using RFID," now U.S. Patent Publication No.: 2019/0088109 A1;

All of the afore-mentioned applications are incorporated herein by this reference in their entirety.

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature detectors such as heat detectors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include temperature detectors such as thermostats, air handlers and systems of ducts and vents for circulating air throughout the building. Business-specific systems include computer systems, manufacturing systems that include various types of computer-aided machinery and test equipment, and inventory control and tracking systems, in examples.

Building management systems require service, including installation, repair, testing, inspection, and compliance testing. When the systems are initially installed, the panels are typically located in a secure part of the building. Then, the distributed devices are installed throughout the building. The panels and the distributed devices must then be interconnected. Wired systems are often used. Although, in some cases wireless links are used to provide interconnection. Then later in the lifecycle, repair may be required. Sensor-type distributed devices can be damaged. They can also become dirty. Inspection and compliance testing is also mandatory for many types of building management systems. Fire alarm systems must be tested typically on a yearly basis, for example.

Recently, it has been proposed to use connected services systems to monitor fire alarm systems. Connected services system are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

Often during service, the connected services systems communicate with the control panel of a fire alarm system and mobile computing devices operated by on-site technicians. This has allowed the control panels to report status information, including devices events from distributed devices connected to the panels, to the connected services systems. Similarly, this has allowed the mobile computing devices, via mobile applications, to display information about the fire alarm systems, receive local service data, including inspection results, service narrative information and/or service completion status for different distributed devices, and send the local service data to the connected services system. By facilitating communication between the control panels and mobile computing devices, and by collecting and storing device events and local service data, connected services systems have been used to facilitate service on fire alarm systems.

For example, typically, the fire alarm devices are periodically tested by technicians (e.g., monthly, quarterly, or annually depending on fire or building codes) to verify that the distributed devices are physically sound, unaltered, working properly, not obstructed, properly labeled, and located in their assigned locations.

This testing of the distributed devices is often accomplished with a walkthrough test. During an inspection, the connected services system receives device events from the control panel, which originated from the distributed devices and local service data from a mobile computing device, including inspection results. Illustrated by way of example, upon activation of a fire alarm device, the control panel receives a signal from the activated device. Event data are generated and sent to the connected services system. The event data are stored and/or logged by the connected services system and also sent to the mobile computing device in real-time. The on-site technician is able to view the event data and verify that the fire alarm device is physically sound, unaltered, working properly, and in its assigned location. The mobile computing device then sends local service data including inspection results to the connected services system, and the technician moves to test the next fire alarm device.

SUMMARY OF THE INVENTION

Typically, testing of temperature detectors (for example, heat detectors of fire alarm systems) involves a technician raising and lowering the temperature with a heat gun and then recording the associated response by the temperature detector. While this process is fairly rudimentary, in the context of walkthrough inspections of fire alarm systems, technicians lack the capacity to carry the equipment necessary to test both heat detectors and smoke detectors. As a result, technicians performing walkthrough inspections often have to go through the building twice: once for testing the heat detectors and another time for testing the smoke detectors. Such testing is time consuming and costly. It would be desirable to have an automated method for testing temperature detectors that includes sending the test data to a connected services system for analysis for indicating when a temperature detector requires service.

According to the present invention, detailed installation and service data for a building management system is sent to a connected services system. That data is collected with specificity regarding the type and location of device being serviced, such as installed, configured, tested or repaired, among other examples. Additionally, the present invention includes a method of reducing the amount of manual testing of heat detectors by continuously tracking the routine fluctuations of temperature detectors that are in the same building or general area of a building. If the data shows that all are trending generally in the same direction and by the same amount, then it is likely that manual testing is not necessary. This is accomplished by sending temperature information from the temperature detectors to the connected services system and then analyzing the temperature information to determine when service or testing is more likely to be required rather than sending a technician to inspect the temperature detectors on a fixed schedule.

In general, according to one aspect, the invention features a service management system for facilitating service of building management systems of a building. A building management system panel interface receives temperature information from temperature detectors connected to one or more building panels, and a temperature detector evaluation module detects outlier temperature information from among the temperature detectors to identify temperature detectors requiring service.

In embodiments, a service workflow module receives scheduled service tasks, based on the temperature detectors requiring service, from the temperature detector evaluation module, and mobile computing devices receive and display the scheduled service tasks from the service workflow module.

The temperature detector evaluation module detects outlier temperature information based on a number of factors, including whether a temperature indicated by temperature information from a particular temperature detector differs from temperatures indicated by temperature information from other temperature detectors by a constant amount over time, a comparison of rate of change information indicated by temperature information from a particular temperature detector to rate of change information indicated by temperature information from other temperature detectors, a comparison of trend information indicated by temperature information from a particular temperature detector to trend information indicated by temperature information from other temperature detectors, whether a temperature indicated by temperature information from a particular temperature detector differs from a temperature indicated by temperature information from other temperature detectors at certain hours, and/or whether temperature information from a particular temperature detector includes discontinuities and/or anomalies in temperature readings.

The temperature detectors include heat detectors of a fire alarm system and/or thermostats of a building automation system.

In general, according to another aspect, the invention features a method for facilitating service of building management systems of a building. Temperature information from temperature detectors connected to one or more building panels is received via a building management system panel interface, and a temperature detector evaluation module detects outlier temperature information from among the temperature detectors to identify temperature detectors requiring service.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
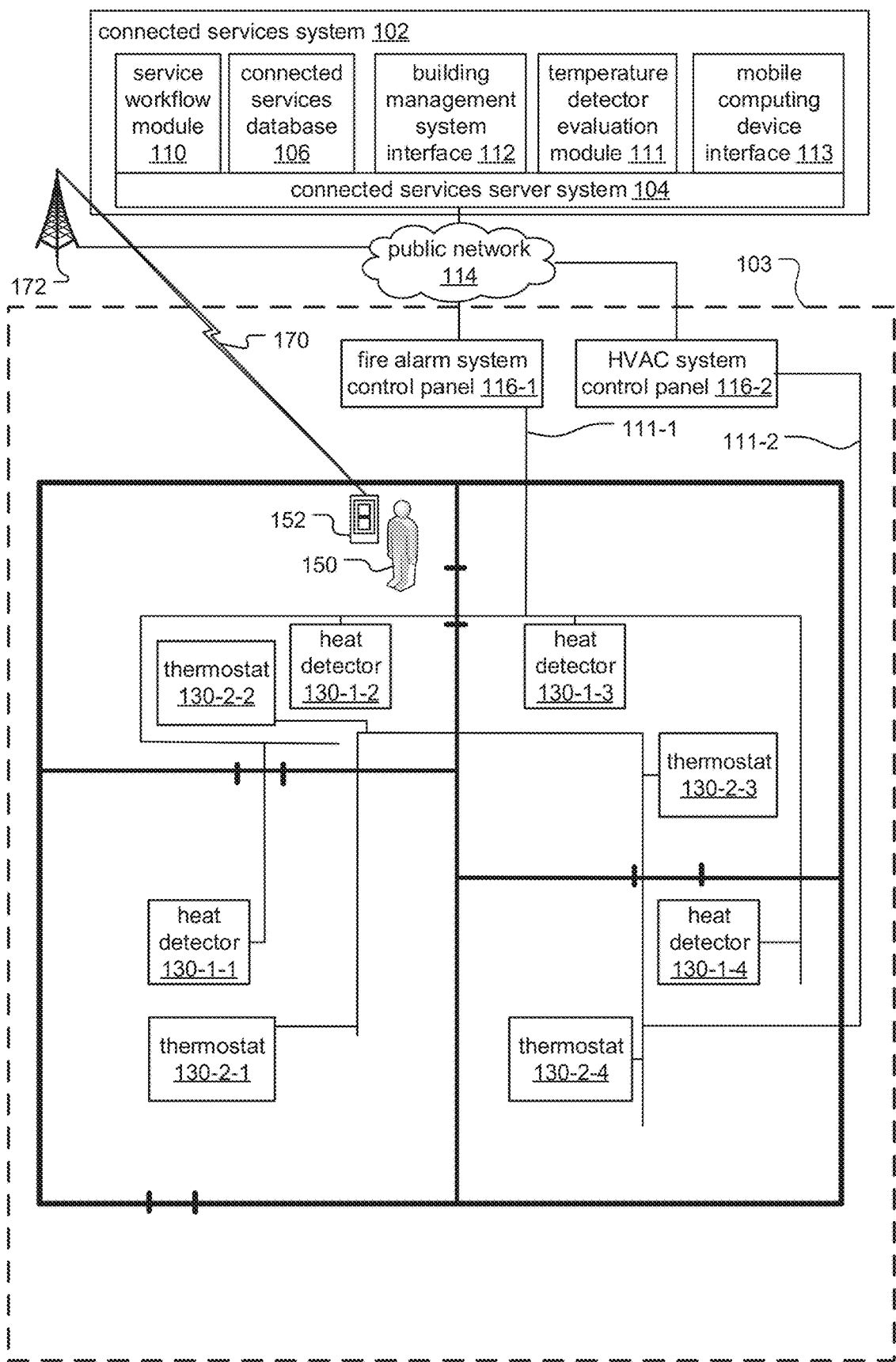
FIG. 1 is a schematic diagram of a service management system according to an embodiment of the current invention.

FIG. 1 is a schematic diagram of a service management system according to an embodiment of the current invention.

The service management system includes a connected services system 102, which, at a high level, communicates with building management systems installed within buildings 103 of various client entities, typically. Examples of client entities include residential, commercial, or governmental companies or agencies. Examples of the buildings include offices, hospitals, warehouses, retail establishments, shopping malls, schools, multi-unit dwellings, government buildings, or casinos, to list a few examples.

In general, the building management systems include control panels 116 and distributed devices. The control panels 116 direct the function of the respective building management system by determining and displaying the operational status of or sensor data from the distributed devices, in particular, from temperature detectors 130.

Temperature detectors 130 are devices for measuring the temperature of the ambient environment with varying degrees of accuracy depending upon the particular function of the type of temperature detector 130. Examples include heat detectors 130-1 of fire alarm systems and thermostats 130-2 of building automation systems such as heating, ventilation and air-conditioning (HVAC) systems.

The temperature detectors 130 are connected to their respective control panels 116 via safety and security wired and/or wireless networks 111 of the building 103. These networks 111 support data and/or analog communication between the temperature detectors 130 and the respective control panels 116. In some embodiments (not illustrated), the temperature detectors 130 from multiple building management systems could all be connected to the same safety and security network 111.

In the illustrated example, heat detectors 130-1 of the fire alarm system are connected to a fire alarm system control panel 116-1 via safety and security network 111-1 and are slave devices of the panel.

The heat detectors 130-1 are alarm initiation devices. In general, alarm initiation devices monitor the buildings for indicators of fire. Upon detection of indicators of fire, device signals are sent from the alarm initiating devices to the control panel 116-1. The device signals are typically alarm signals and/or analog values. The alarm signals are used to signal the control panel 116-1 that a fire has been detected. Alternatively, some devices provide analog values to indicate measured conditions. In one example, heat detectors 130-1 provide analog values for measured temperatures. The control panel 116-1 then determines if the analog values are indicative of a fire. Additionally, in some examples, the alarm initiation devices provide both alarm signals and analog values.

Thermostats 130-2 of the building automation system, on the other hand, are connected to an HVAC system control panel 116-2 via a second network 111-2.

The thermostats 130-2 are used in regulating the temperature of the building 103. For example, when the temperature detected by the thermostats 130-2 falls below a predetermined value, the HVAC, system control panel 116-2 sends instructions activating a heating system to circulate warm air throughout the building 103 and thus raise the temperature.

In the illustrated example, a technician 150 holding a mobile computing device 152 is also shown. The technician 150 is an individual performing service on the building management systems, including employees of entities occupying the building 103, property managers, building management system manufacturers and/or providers of service for building management systems.

In the illustrated example, the mobile computing device 152 is a smartphone device. Alternatively, the mobile computing device 152 could be a laptop computer, tablet computer, phablet computer (i.e., a mobile device that is typically larger than a smart phone, but smaller than a tablet), smart watch, or specialized service and/or testing device to list a few examples. The mobile computing device 152, which is operated by the technician 150, presents information about the building management systems, receives local service data from the technician, including inspection results, service narrative information and/or service completion status for different devices, and sends the local service data to the connected services system 102.

Each of the fire alarm system control panel 116-1; HVAC system control panel 116-2, and mobile computing device 152, are connected to the connected services system 102 via a leased data connection, private network and/or public network 114, such as the internet. In some cases, the control panels 116 have been given network connectivity to communicate with the connected services system 102; in other cases, testing computers connected to the control panels 116 function as gateways. The mobile computing device 152 connects to the public network 114 via a wireless communication link 170 to a cellular radio tower 172 of a mobile broadband or cellular network or public and/or private wired data networks such as an enterprise network, Wi-Max, or network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes modules, including a service workflow module 110 and a temperature detector evaluation module 111. Each of these modules is associated with separate tasks. In some cases, these modules are discrete modules or they are combined with other modules into a unified code base. They can be running on the same server or different servers, virtualized server system, or a distributed computing system.

The service workflow module 110 functions as an application server that communicates with the mobile computing device 152. The service workflow module 110 provides the steps necessary for the technician 150 to service the building management system, including sending scheduled service tasks to the mobile computing device 152. During both normal operation of and service on the building management systems, the service workflow module 110 receives device events, including temperature information, from panels 116 and/or temperature detectors 130, storing the device events to a connected services database 106.

The connected services database 106 provides customer specific installation information to the service workflow module 110 and temperature detector evaluation module 111. In particular, the connected services database 106 includes device information such as lists of control panels 116 installed at various customer premises, the temperature detectors 130 and other distributed devices maintained by those panels, and historical test data, device events, temperature information and status information associated with those panels, temperature detectors 130, and distributed devices.

In general, the temperature detector evaluation module 111 retrieves device events generated by temperature sensors 130 from the connected services database 106, generates aggregate temperature information based on the device events, determines which temperature sensors 130 require service, and pushes scheduled service tasks to the service workflow module 110. The aggregate temperature information is a combination of temperature information from several different temperature detectors 130. The temperature detectors 130 included in the aggregate temperature information can include all temperature detectors 130 within a building 103 or can be limited to only temperature detectors in a selected area of the building 103. Additionally, the aggregate temperature information can include individual temperature information from all temperature detectors, average temperature information for particular types of temperature detectors 130 (such as heat detectors 130-1 or thermostats 130-2), or a combination thereof, among other examples. The temperature detector evaluation module 111 determines which temperature detectors 130 require service, generally, by detecting outlier temperature information from among the aggregate temperature information.

The connected services system 102 also includes a building management system interface 112 and a mobile computing device interface 115.

The building management system interface 112 operates as the interface between the service workflow module 110 and the control panel 116. In particular, the building management system interface 112 converts instructions from the service workflow module 110 into instructions that are formatted into the protocol implemented by the particular panel. Additionally, the building management system interface 112 receives information such as device events from the current control panel 116 or distributed device 130 under service and converts those device events into a uniform format that can be consumed by the service workflow module 110 and/or the temperature detector evaluation module 111, regardless of the underlying protocol implemented by the panels 116 and temperature detectors 130.

The mobile computing device interface 115 operates as an interface between the service workflow module 110 and mobile computing devices 152 used by technicians 150 performing the service.

Figure 2:
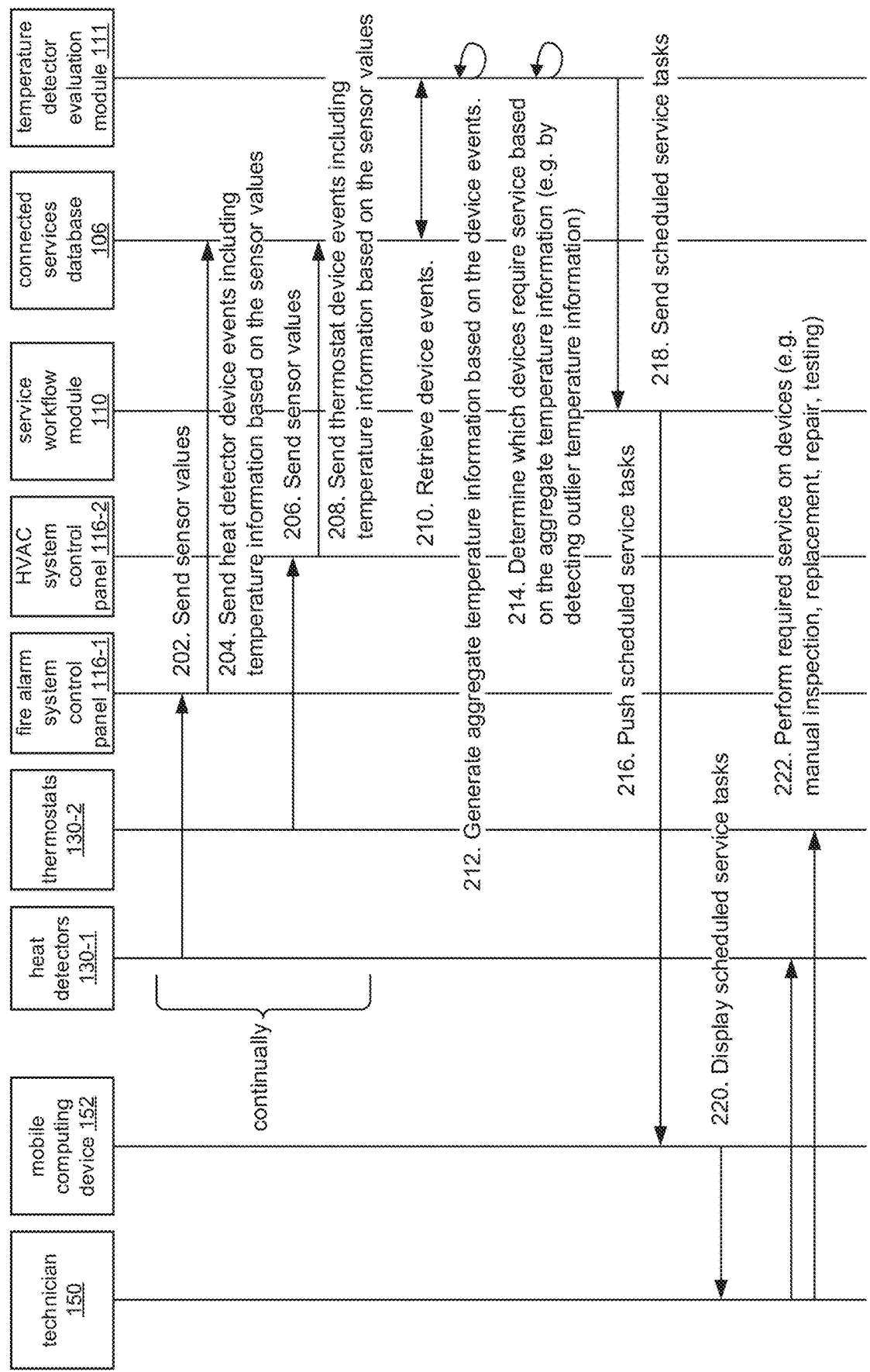
FIG. 2 is a sequence diagram illustrating the process by which the temperature information is accumulated in the connected services database and analyzed by the temperature detector evaluation module.

FIG. 2 is a sequence diagram illustrating the process by which the temperature information is accumulated in the connected services database 106 and analyzed by the temperature detector evaluation module 111.

In step 202, the heat detectors 130-1 send sensor values to the fire alarm system control panel 116-1, which sends heat detector device events, including temperature information based on the sensor values, to be stored in the connected services database 106 in step 204. Similarly, in step 206, the thermostats 130-2 send sensor values to the HVAC system control panel 116-2, which sends thermostat device events to be stored in the connected services database 106 in step 208.

Steps 202 through 208 proceed on a continual basis during normal operation of the building management systems. In this way, the connected services database 106 accumulates a record of temperature information from the different temperature detectors 130 over time.

In step 210, the temperature detector evaluation module 111 retrieves the device events from the temperature detectors 130 from the connected services database 106 and generates aggregate temperature information based on the device events in step 212. In step 214, the temperature detector evaluation module 111 determines which devices require service based on the aggregate temperature information (for example, by detecting outlier temperature information).

In step 216, the temperature detector evaluation module 111 pushes scheduled service tasks to the service workflow module 110. The scheduled service tasks are based on the temperature detectors 130 determined to require service by the temperature detector evaluation module 111.

In step 218, the service workflow module 110 sends the scheduled service tasks to the mobile computing device 152, which displays them to the technician 150 in step 220. In one example, the technician 150 views the scheduled service tasks pertaining to the temperature detectors 130 during a previously scheduled inspection of the fire alarm system, allowing the technician 150 to test only the temperature detectors 130 indicated by the scheduled service tasks.

Finally, in step 222, the technician 150 performs the required service on the temperature detectors 130 according to the scheduled service tasks. The service can include manual inspection, replacement, repair, or further testing, among other examples.

Figure 3:
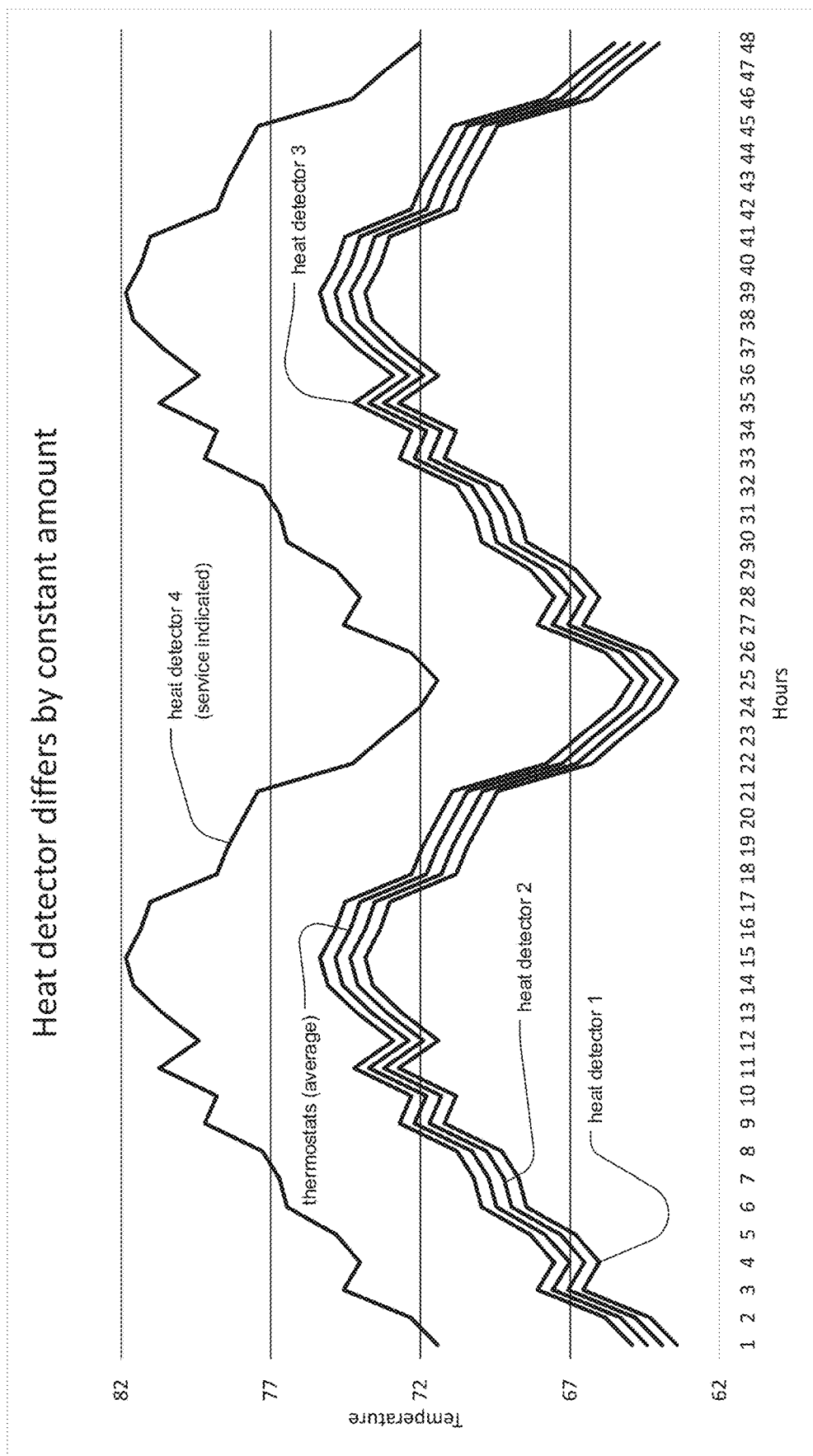
FIG. 3 is a graph depicting an example of aggregate temperature information generated by the temperature detector evaluation module, in which the temperature from one temperature detector differs from the others by a constant amount over time.

FIG. 3 is a graph depicting an example of aggregate temperature information generated by the temperature detector evaluation module 111, in which the temperature from one temperature detector 130 differs from the others by a constant amount over time.

In general, the y-axis of the graph represents the temperature, while the x-axis represents the hours over a 48 hour period. A set of curves represent the individual temperatures detected by exemplary heat detectors 1, 2, 3 and 4, as well as an average temperature detected by all of the thermostats from an exemplary HVAC system installed in the same building 103 as the heat detectors. The temperature information can be compared among temperature detectors 130 of the same type as well as those of different types (and from different building management systems).

According to the graph, the curve for heat detector 4 indicates temperature readings that are consistently ten degrees higher than those for each of heat detectors 1, 2, and 3, and for the average of all thermostats. As a result, required service is indicated for heat detector 4.

Figure 4:
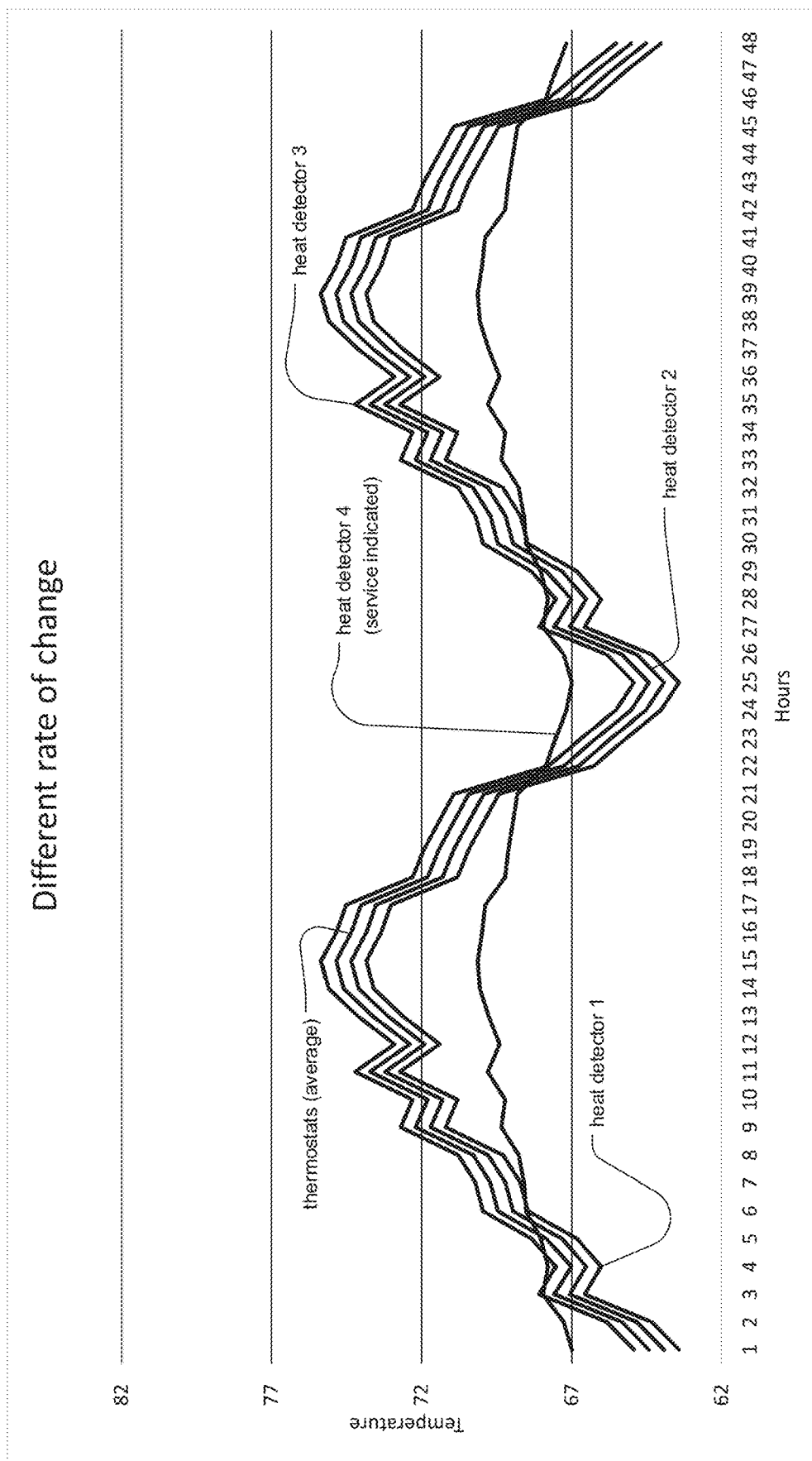
FIG. 4 is a graph depicting an example of aggregate temperature information generated by the temperature detector evaluation module, in which the temperature from one temperature detector has a rate of change that differs from that of the others.

FIG. 4 is a graph depicting an example of aggregate temperature information generated by the temperature detector evaluation module 111, in which the temperature from one temperature detector 130 has a rate of change that differs from that of the others.

According to the graph, the curve for heat detector 4 indicates temperature readings that rise and fall during the course of the day more slowly than those for each of heat detectors 1, 2, and 3, and for the average of all thermostats. As a result, required service is indicated for heat detector 4. In this example, heat detector 4 might be covered with insulation, requiring service such as manual testing and possibly relocation.

Figure 5:
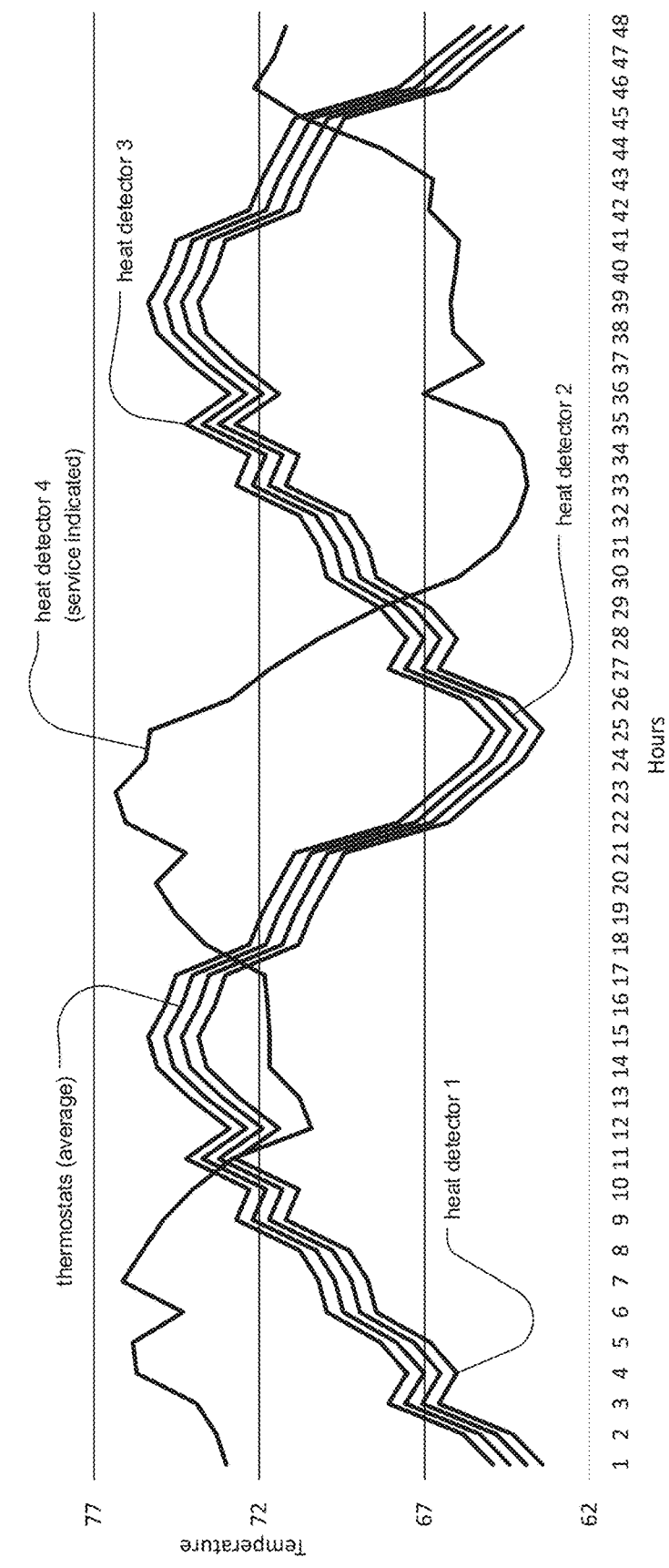
FIG. 5 is a graph depicting an example of aggregate temperature information generated by the temperature detector evaluation module, in which the temperature from one temperature detector trends differently from the others.

FIG. 5 is a graph depicting an example of aggregate temperature information generated by the temperature detector evaluation module 111, in which the temperature from one temperature detector 130 trends differently from the others.

According to the graph, the curve for heat detector 4 indicates temperature readings that rise and fall during the course of the day arbitrarily with respect to those for each of heat detectors 1, 2, and 3, and for the average of all thermostats. As a result, required service is indicated for heat detector 4.

Figure 6:
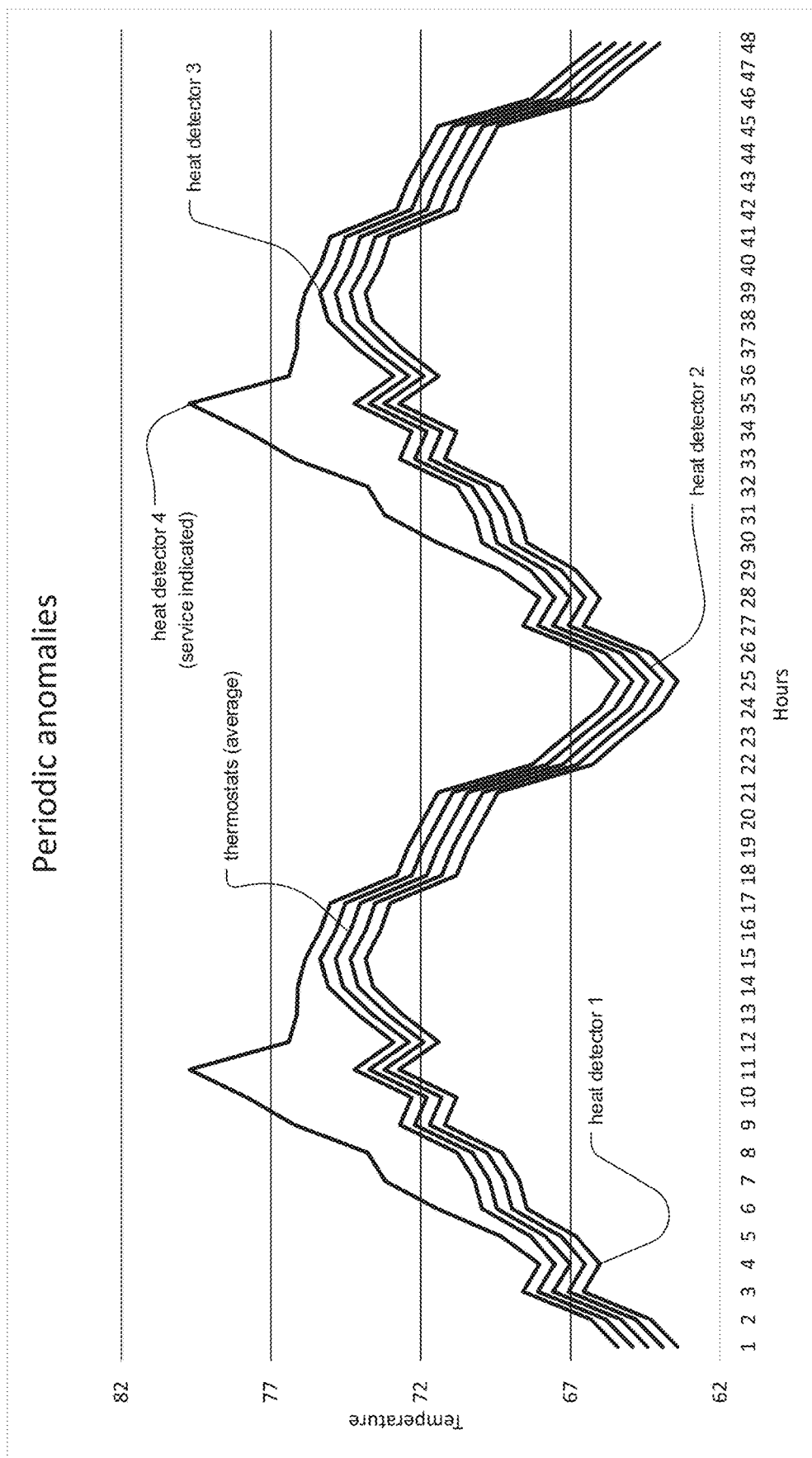
FIG. 6 is a graph depicting an example of aggregate temperature information generated by the temperature detector evaluation module, in which the temperature from one heat detector generally trends with the others but exhibits anomalies at certain hours of the day.

FIG. 6 is a graph depicting an example of aggregate temperature information generated by the temperature detector evaluation module 111, in which the temperature from one heat detector generally trends with the others but exhibits anomalies at certain hours of the day.

According to the graph, the curve for heat detector 4 indicates temperature readings that rise and fall during the course of the day consistent with respect to those for each of heat detectors 1, 2, and 3, and for the average of all thermostats, except for certain hours of the day in which the temperature readings rapidly increase. As a result, required service is indicated for heat detector 4. In this example, heat detector 4 might be installed near an appliance or other fixture that emits localized heat periodically, requiring service such as a manual test.

Figure 7:
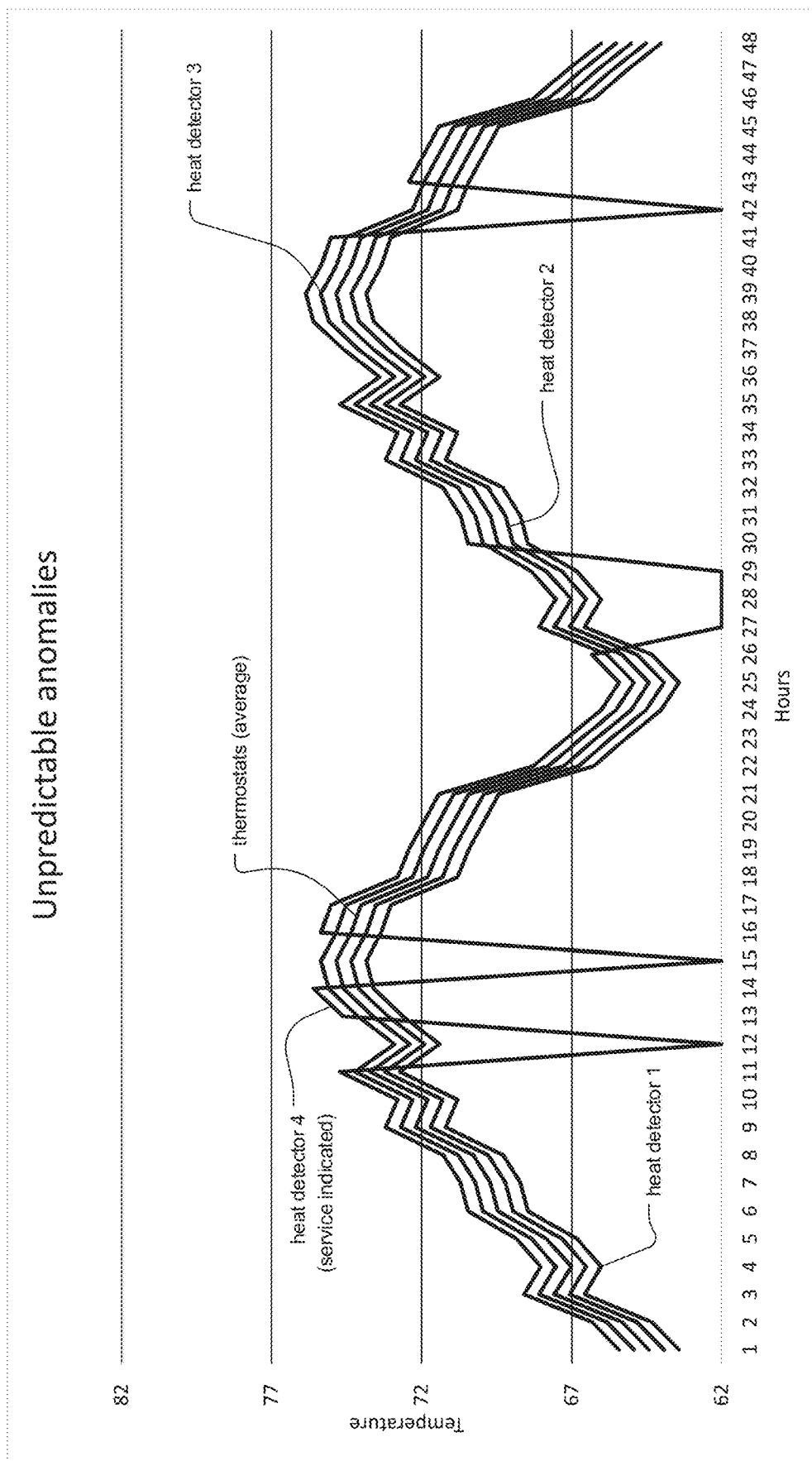
FIG. 7 is a graph depicting an example of aggregate temperature information generated by the temperature detector evaluation module, in which is the temperature from one temperature detector exhibits unpredictable anomalies.

FIG. 7 is a graph depicting an example of aggregate temperature information generated by the temperature detector evaluation module 111, in which is the temperature from one temperature detector 130 exhibits unpredictable anomalies.

According to the graph, the curve for heat detector 4 indicates temperature readings that rise and fall during the course of the day consistent with respect to those for each of heat detectors 1, 2, and 3, and for the average of all thermostats, except for certain hours of the day in which the temperature readings decrease at an implausible rate. As a result, required service is indicated for heat detector 4. In this example, heat detector 4 might be exhibiting an electrical problem, requiring service such as repair or replacement.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for facilitating service of building management systems of a building, comprising:
receiving a plurality of device events via a building management system panel interface, wherein the plurality of device events includes temperature information that is based on sensor values from a plurality of heterogenous temperature detectors connected to one or more building panels, wherein the plurality of heterogenous temperature detectors measure temperatures of an ambient environment of the building;
converting the temperature information to a uniform format;
detecting outlier temperature information based on whether the temperature information includes discontinuities and/or anomalies via a temperature detector evaluation module; and
identifying that a particular temperature detector that is associated with the outlier temperature information requires the service via the temperature detector evaluation module.

2. The method as claimed in claim 1, further comprising receiving, via a service workflow module, scheduled service tasks from the temperature detector evaluation module, wherein a scheduled service task of the scheduled service tasks corresponds to the particular temperature detector requiring the service.

3. The method as claimed in claim 2, further comprising transmitting, to a mobile computing device to be displayed, the scheduled service tasks from the service workflow module.

4. The method as claimed in claim 1, further comprising detecting the outlier temperature information based on whether a temperature indicated by a device event from the particular temperature detector differs from temperatures indicated by ones of the plurality of device events from other temperature detectors of the plurality of heterogenous temperature detectors by a constant amount over time.

5. The method as claimed in claim 1, further comprising the temperature detector evaluation module detecting the outlier temperature information based on a comparison of rate of change information indicated by temperature information from the particular temperature detector to rate of change information indicated by ones of the plurality of device events from other temperature detectors of the plurality of heterogenous temperature detectors.

6. The method as claimed in claim 1, further comprising the temperature detector evaluation module detecting the outlier temperature information based on a comparison of trend information indicated by a device event from the particular temperature detector to trend information indicated by ones of the plurality of device events from other temperature detectors of the plurality of heterogenous temperature detectors.

7. The method as claimed in claim 1, further comprising the temperature detector evaluation module detecting the outlier temperature information based on whether a temperature indicated by a device event from the particular temperature detector differs from respective temperature information indicated by respective ones of the plurality of device events from other temperature detectors of the plurality of heterogenous temperature detectors at certain hours.

8. The method as claimed in claim 1, wherein receiving the plurality of device events from the plurality of heterogenous temperature detectors comprises receiving a device event of the plurality of device events from a heat detector of a fire alarm system.

9. The method as claimed in claim 1, wherein receiving the plurality of device events from the plurality of heterogenous temperature detectors comprises receiving a device event of the plurality of device events from a thermostat of a building automation system.

10. A method comprising:
   receiving temperature information from one or more control panels of a building management system, wherein the temperature information is based on sensor values received by the one or more control panels from a plurality of heterogenous temperature detectors for measuring temperatures of ambient environments of a building;
   converting the temperature information into a uniform format configured for consumption by a temperature detector evaluation module;
   generating aggregate temperature information based on the temperature information;
   identifying a particular temperature detector requiring service based on detecting outlier temperature information from among the aggregate temperature information; and
   transmitting service tasks for the particular temperature detector requiring the service to one or more mobile computing devices associated with a technician that performs the service on the building management system.

11. The method of claim 10, further comprising:
   accumulating, via a connected services database, a record of temperature information from the plurality of heterogenous temperature detectors over time by continually receiving the temperature information from the plurality of heterogenous temperature detectors during normal operation of the building management system; and
   generating the aggregate temperature information based on the temperature information stored by the connected services database.

12. The method of claim 10, wherein the aggregate temperature information is a combination of temperature information from a plurality of different temperature detectors of the building management system over time during normal operation of the plurality of heterogenous temperature detectors.

13. The method of claim 12, wherein the aggregate temperature information includes information for all temperature detectors within the building, information for only temperature detectors in a selected area of the building, and/or average temperature information for a particular type of temperature detector.

14. The method of claim 12, wherein identifying the particular temperature detector requiring the service based on detecting the outlier temperature information from among the aggregate temperature information includes determining that the particular temperature detector requires the service in response to determining that the aggregate temperature information indicates that temperature readings from the particular temperature detector consistently differ by a constant amount over time from temperature readings from other temperature detectors.

15. The method of claim 12, wherein identifying the particular temperature detector requiring service based on detecting the outlier temperature information from among the aggregate temperature information includes determining that the particular temperature detector is potentially covered and determining that the aggregate temperature information indicates that temperature readings from the particular temperature detector rise and fall during a course of a day at a different rate than temperature readings from other temperature detectors.

16. The method of claim 12, wherein identifying the particular temperature detector requiring the service based on detecting the outlier temperature information from among the aggregate temperature information includes determining that the particular temperature detector requires service in response to determining that the aggregate temperature information indicates that temperature readings from the particular temperature detector rise and fall during a course of a day arbitrarily with respect to temperature readings from other temperature detectors.

17. The method of claim 12, wherein identifying the particular temperature detector requiring the service based on detecting the outlier temperature information from among the aggregate temperature information includes determining that the particular temperature detector is potentially installed near an appliance or fixture that emits localized heat periodically and determining that the aggregate temperature information indicates that temperature readings from the particular temperature detector exhibit anomalies at certain hours of a day but otherwise rise and fall during a course of the day within a predetermined range of the temperature readings from other temperature detectors.

18. The method of claim 12, wherein identifying the particular temperature detector requiring the service based on detecting the outlier temperature information from among the aggregate temperature information includes determining that the particular temperature detector potentially has an electrical problem and determining that the aggregate temperature information indicates that temperature readings from the particular temperature detector change at an implausible rate at certain hours of a day but otherwise rise and fall during a course of the day within a predetermined range of the temperature readings from other temperature detectors.

19. The method of claim 12, wherein the plurality of heterogenous temperature detectors include one or more heat detectors of a fire alarm system and one or more thermostats of a building automation system, and identifying the particular temperature detector requiring the service based on detecting outlier temperature information from among the aggregate temperature information includes determining that a particular heat detector from the fire alarm system requires the service in response to comparing temperature readings from the particular heat detector with average temperature readings from the one or more thermostats.

20. A service management system for facilitating service of building management systems of a building, comprising:
   a building management system panel interface for:
      receiving a plurality of device events that include temperature information that is based on sensor values from a plurality of heterogenous temperature detectors connected to one or more building panels, wherein the plurality of heterogenous temperature detectors measure temperatures of an ambient environment of the building; and
      converting the temperature information to a uniform format; and
   a temperature detector evaluation module for:

detecting outlier temperature information based on whether the temperature information includes discontinuities and/or anomalies; and identifying that a particular temperature detector that is associated with the outlier temperature information requires the service.

21. The service management system as claimed in claim 20, further comprising a service workflow module for receiving scheduled service tasks from the temperature detector evaluation module, wherein a scheduled service task of the scheduled service tasks corresponds to the particular temperature detector requiring the service.

22. The service management system as claimed in claim 21, further comprising mobile computing devices for receiving and displaying the scheduled service tasks from the service workflow module.

23. The service management system as claimed in claim 20, wherein the temperature detector evaluation module further detects the outlier temperature information based on whether a temperature indicated by a device event from the particular temperature detector differs from temperatures indicated by ones of the plurality of device events from other temperature detectors of the plurality of heterogenous temperature detectors by a constant amount over time.

24. The service management system as claimed in claim 20, wherein the temperature detector evaluation module further detects the outlier temperature information based on a comparison of rate of change information indicated by a device event from the particular temperature detector to rate of change information indicated by ones of the plurality of device events from other temperature detectors of the plurality of heterogenous temperature detectors.

25. The service management system as claimed in claim 20, wherein the temperature detector evaluation module further detects the outlier temperature information based on a comparison of trend information indicated by a device device from the particular temperature detector to trend information indicated by ones of the plurality of device events from other temperature detectors of the plurality of heterogenous temperature detectors.

26. The service management system as claimed in claim 20, wherein the temperature detector evaluation module further detects the outlier temperature information based on whether a temperature indicated by a device event from the particular temperature detector differs from respective temperature information indicated by respective ones of the plurality of device events from other temperature detectors of the plurality of heterogenous temperature detectors at certain hours.

27. The service management system as claimed in claim 20, wherein the plurality of heterogenous temperature detectors include heat detectors of a fire alarm system.

28. The service management system as claimed in claim 20, wherein the plurality of heterogenous temperature detectors include thermostats of a building automation system.

* * * * *